Oct. 10, 1944.  R. L. ANDERSON  2,359,960
PUMPING MECHANISM
Filed Aug. 12, 1943  2 Sheets-Sheet 1

Inventor
ROLLAND L. ANDERSON
By Semmes, Keegin, Beale & Semmes
Attorneys

Oct. 10, 1944.  R. L. ANDERSON  2,359,960
PUMPING MECHANISM
Filed Aug. 12, 1943  2 Sheets-Sheet 2
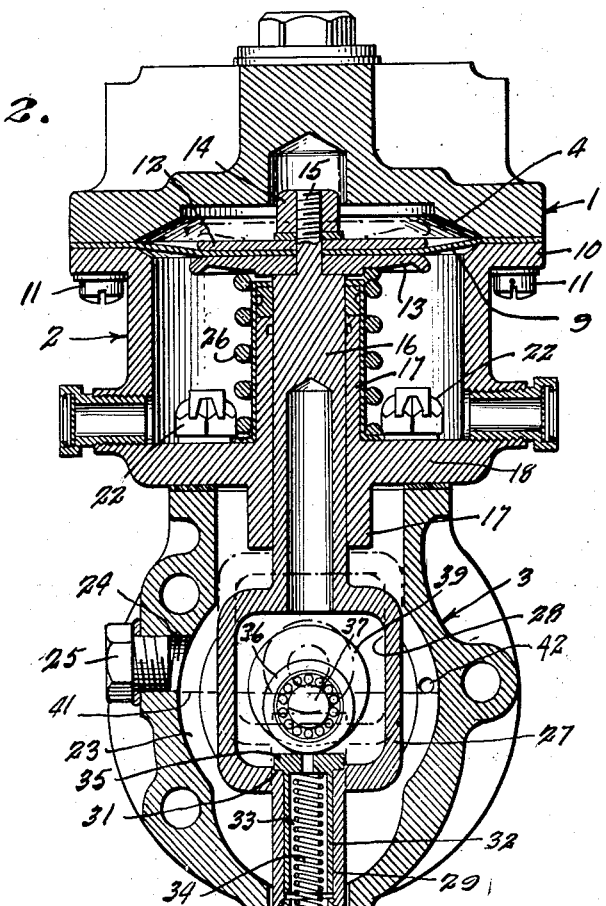
Fig. 2.
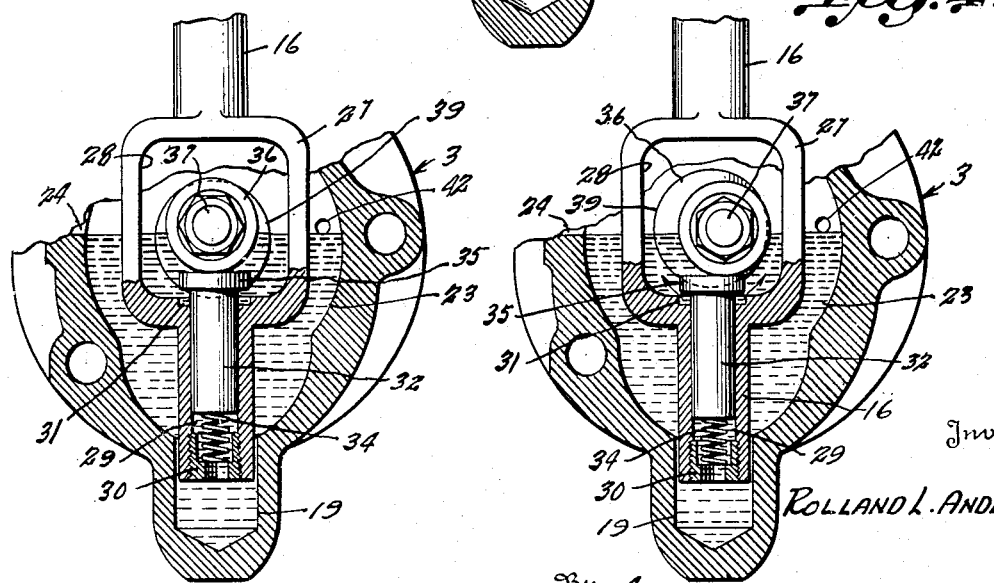
Fig. 3.  Fig. 4.
Inventor
ROLLAND L. ANDERSON
By Semmes, Keegin Beale & Semmes
Attorneys Patented Oct. 10, 1944

2,359,960

UNITED STATES PATENT OFFICE 2,359,960

PUMPING MECHANISM

Rolland L. Anderson, Memphis, Tenn., assignor to Chicago & Southern Air Lines, Inc., Memphis, Tenn., a corporation of Delaware Application August 12, 1943, Serial No. 498,361

9 Claims. (Cl. 103—38)

The present invention relates to pumping mechanisms and more particularly to lost motion mechanisms for effecting conditional variations in the displacement of fluid pumps and to means damping the movement of the operating parts of such mechanisms.

In its more specific application, this invention contemplates the incorporation of a cushioning mechanism in the lost motion drive of a variable displacement diaphragm pump of a type wherein the diaphragm stem is conditionally moved relative to the driving means therefor by the reaction on the diaphragm of developed pump pressures to effect variations in the stroke of the diaphragm.

Variable stroke pumps of the above types are highly efficient and are adaptable for many uses where it is desired to maintain a constant or a conditionally optimum pressure, for example in pressurizing the ignition harness of an aviation engine for the purpose of suppressing corona. The operation of this type pump, however, has certain inherent disadvantages. Due to the fact that the driven member of the pump is alternately engaged and disengaged by the driving member during periods of shortened strokes in the pumping operation, objectionable operating noises and vibrations result. Moreover, undue wear and shortened life is imposed on the bearings and other parts of the pump.

In order to overcome these disadvantages and to provide a more satisfactorily operating apparatus it is the purpose of this invention to interpose a cushioning mechanism in the drive to absorb the shock of interengagement between the relatively movable parts. In providing this cushion, I prefer to employ a hydraulic shock damping mechanism employing a supply of the lubricating oil of the apparatus as the hydraulic fluid.

To make my invention more clearly understood, I have shown in the accompanying drawings means for carrying the same into practical effect without limiting the improvements in their useful application to the particular constructions, which for the purpose of explanation have been made the subject of illustration.

In the drawings:

Figure 2 is a transverse sectional view taken along the line 2—2 of Figure 1 looking in the direction of the arrows.

Figure 3 is a fragmental transverse sectional view illustrating the parts of the lost motion drive at the end of a shortened discharge stroke of the pump.

Figure 4 is a view similar to Figure 3 illustrating the position of the parts near the end of the intake stroke of the pump.

Figure 1:
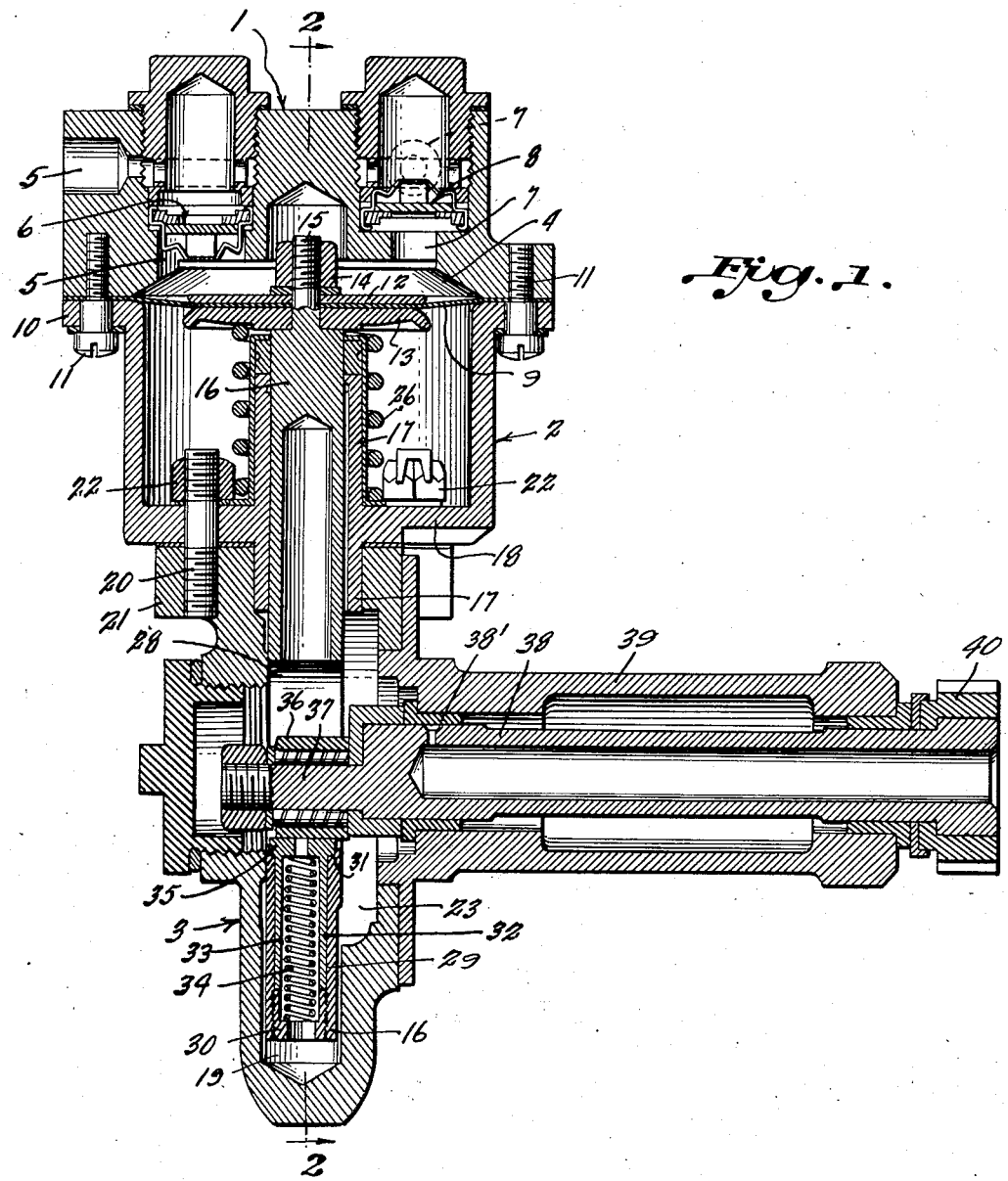
Figure 1 is a longitudinal sectional view of a variable displacement diaphragm pump having a lost motion drive and employing my shock damping means in said drive.

Referring more particularly to the drawings I have shown in Figures 1 and 2 a pump having a casing comprising an upper casting 1, an intermediate casting 2 and a lower casting 3. The upper casting 1 is formed with its lower surface concave to provide a pumping chamber 4. Communicating with the chamber 4 is an inlet duct 5 controlled by a check valve mechanism 6, and a discharge duct 7 controlled by a similar but oppositely working check valve 8.

A flexible diaphragm 9 forms the lower wall of the pumping chamber and is sealed to the periphery of the lower face of the casting 1 by means of the flanged rim 10 of the intermediate cup-shaped casting 2 which is secured to the upper casting 1 by means of cap screws 11. The central portion of the diaphragm 9 is confined, in the usual manner, between discs 12 and 13, adjacent the upper and lower faces of the diaphragm respectively, by means of a nut 14 drawn up on the reduced, screw threaded end 15 of a stem member 16. The stem 16 is mounted for reciprocation in a bearing sleeve 17, concentrically formed on the lower wall 18 of the casting 2. The stem extends through the sleeve 17 into the interior of the lower casting 3, and has its lower end journaled in a socket 19 provided therefor in the bottom of the casting 3.

The casting 3 forms, in effect, the crank case of the pump and is secured to the under face of the intermediate cup-shaped casting 2 by means of studs 20 carried by an upper flange 21 of the casting 3, which studs pass through the wall 18 and are fitted with nuts 22. As best shown in Figure 2, the interior of the casting 3 provides a reservoir 23 for lubricating oil which may be introduced thereto through a filling aperture 24, normally closed by a screw threaded plug 25.

Flexure of the diaphragm 9 serves to increase and decrease the volume of the pumping chamber 4, drawing air from outside through the valve controlled duct 5 into the chamber 4 as the chamber is enlarged, and forcing this air out through the valve controlled discharge duct 7 to a point of delivery when the chamber is reduced. Obviously, as pressure is built up at the point of delivery (for instance in an ignition harness) an increasingly greater force will become necessary to flex the diaphragm on its discharge stroke. This condition is utilized to vary the displacement or delivery of the pump in accordance with pressure requirements at the point of delivery by employing a drive for the pump which includes yieldable means for flexing the diaphragm on its discharge stroke, and lost motion positive means for effecting the suction stroke of the diaphragm.

In the specific embodiment shown, the yieldable discharge means comprises a helical compression spring 26 surrounding the sleeve 17 and extending between the bottom of the cup-shaped casting 2 and the lower face of the diaphragm disc 13. This spring, normally urges the diaphragm upward to decrease the volume of the pumping chamber 4, and has a compression force selected with reference to the area of the diaphragm, to give a desired maximum output pressure for the pump.

To effect the suction stroke of the pump, that is, to flex the diaphragm 9 downwardly to enlarge the pumping chamber and draw air thereinto, and also to provide the lost motion drive which serves to vary the pump displacement, the following structure is provided.

Intermediate that portion within the crank case, the stem 16 is extended laterally, as shown at 27, and provided with an aperture 28. The lower portion of the stem, i. e. that portion from the aperture 28 to the extremity of the stem, is provided with an axial bore 29, the lower end of which is fitted with a centrally apertured, screw threaded socket 30. The upper end of the bore is counter-bored to provide a small reservoir 31, the function of which will be later set forth.

Slideably positioned in the bore 29 is a plunger 32 having an axial socket 33 in which is positioned a light compression spring 34 engaging the screw threaded socket 30 to normally extend the plunger upwardly into the aperture 28. The upper or projecting end of the plunger 32 is exteriorly flanged to provide an enlarged head 35 having a diameter just slightly less than the diameter of the counterbore 31. A central bleed aperture is provided in the head 35 to communicate with the bore 29. When the plunger is in its fully retracted position within the bore 29, as shown in full lines in Figure 2, the flanged head 35 fits within the counterbore 31, the bottom face of the flange abutting the bottom of the counterbore so that the upper face of the plunger projects slightly above the lower surface of the aperture 28 in the diaphragm stem.

To effect the suction stroke of the pump, motion is transmitted to the stem 16 by means of a roller 36 which is mounted for antifrictional rotation on an eccentric extension 37 of the inner end of a drive shaft 38. The shaft 38 is suitably journaled for rotation such as in a bearing sleeve 39 extending laterally from the rear face of the crank case 2 and positioned so that the roller 26 moves within the aperture 28 and is engaged by the projecting end or head 35 of the plunger 32.

In the drawings, for purpose of illustration, a gear 40 is shown secured to the outer end of the shaft 38 for imparting rotation to the shaft. If the pump is to be employed in supercharging the ignition harness of an aviation engine, as mentioned above, the pump may be mounted directly to one of the standard accessory pads of the engine, the bearing sleeve projecting into the engine accessory drive housing and the gear 40 meshed with a suitable gear in the accessory drive. The pump is not limited to such use, however, and any other suitable means of driving the pump could be employed, for instance, a belt or chain drive or gear drive from a supplemental motor.

To put the pump in condition for operation, lubricating oil is introduced into the reservoir 23 through the opening 24 until it starts to overflow through this opening at which time its level will be that indicated by the dash line 41 in Figure 2. This oil not only serves as a lubricant for the roller 36, plunger 32, shaft 38 and, by splash, the stem 16, but also serves as a hydraulic medium in damping the movement of the operating parts of the pump and absorbing the shock of interengagement between parts as will now be described.

In lieu of the above method of supplying oil to the reservoir 23, when the pump is installed as an engine accessory, as above set forth, the oil in reservoir 23 may be supplied from the engine pressure lubrication system by pressurizing the bearings of the drive shaft 38. Pressure oil escaping from shaft bearing 38', adjacent the cam, collects in reservoir 23 and may be established and maintained at correct level by a drilled drain passage 42, at the proper height, and adapted to connect reservoir 23 with the main engine crank-case interior. When oil is introduced into the reservoir 23, as in the preceding paragraph, the passage 42 may be blocked.

Considering the operation of the pump commencing with the roller 36 at top dead center, the spring 26 forces the diaphragm and stem 16 to their extreme upward position as indicated by dotted lines in Figure 2. This full movement of the diaphragm moves the stem 16 upwardly with respect to the roller and fully retracts the plunger 32 in its socket 29 whereby the flanged head 35 of the plunger is seated within the reservoir 31.

Upon rotation of the shaft 38, a crank movement is imparted to the eccentrically mounted roller 36, which moves the stem downwardly flexing the diaphragm 9 to enlarge the chamber 4 to draw in air through the intake duct 5 and at the same time compressing the spring 26. As the roller moves up, on further rotation of its shaft 38, tension on the stem 16 is relieved and the energy stored in the spring 26 flexes the diaphragm to again reduce the pumping chamber and thereby displace the air in the chamber, through the discharge duct 7, to its point of use. As pressure is built up on the delivery side of the pump during the continued cycle of intake and discharge strokes, this increasing pressure reacts on the upper face of the diaphragm causing the spring 26 to yield and to displace the stem 16 downwardly with respect to the axis of the shaft 38. This downward displacement of the diaphragm stem is illustrated in Figure 3 and has the effect of shortening the stroke of the stem, which continues with increasing pressure, until the pressure developed by the pump balances the effective force of the discharging spring 26. At such time, the stem 16 has moved downwardly to the limit of its suction stroke, or in other words, to the position where it is no longer affected by movement of the roller 36. Obviously, when this condition occurs, pumping ceases until the pressure at the point of pump delivery may be reduced, through leakage or use, and thus relieve the pressure on the upper face of the diaphragm to permit the spring once more to function and move the stem 16 upwardly to again be operated on by the roller 26. During all positions of the diaphragm stem, however, the head of the plunger 32 is maintained in engagement with the roller by means of the compression spring 34.

As stated above, lubricating oil is contained within the crank case 3 to the level indicated, that is, a level above the lower portion of the slot 28 in all positions of the stem, and consequently the reservoir 31 is at all times in communication with this body of oil. When the stem 16 is displaced downwardly by developed pressure, as shown in Figure 3, and the head 35 of the plunger is forced out of the reservoir 31 by the spring 34 during the up movement of the roller 26, oil will flow into and fill the reservoir 31. As the roller 26 moves on its down swing the plunger 32 is retracted into the bore 29 in a substantially unrestricted movement until the plunger head starts to enter the reservoir 31, as shown in Figure 4. At this time further downward movement of the roller is yieldingly transmitted to the stem 16 through the plunger head and the body of oil in the reservoir, the oil being gradually displaced from the reservoir 31 through the restricted space provided by the slight differences in diameters of the plunger head and the reservoir. Such an arrangement functions as a dash pot between the diaphragm stem and the operating member to effectively damp the movement of the stem and diaphragm and to absorb the shock of the intermittent engagement of the cooperating parts of the drive. By its effect, noise of operation is substantially eliminated and strains and wear on the operating parts of the pump are reduced to a minimum.

While I have shown and described a preferred embodiment of my invention, I wish it understood that I do not confine myself to the precise details of construction herein set forth by way of illustration, as it is apparent that many variations may be made therein by those skilled in the art without departing from the spirit of the invention, or exceeding the scope of the appended claims.

I claim:

1. In a variable delivery pump, a reciprocable pumping member, resilient means for imparting delivery strokes thereto, a cyclically movable driving member, an actuating member having a positive connection with the pumping member and adapted to impart suction strokes thereto, said actuating member being conditionally movable with respect to said driving member by the reaction of developed pump pressures on said pumping member for varying the stroke thereof, and a hydraulic shock damping coupling operatively connecting the actuating member and driving member.

2. In a variable delivery pump, a reciprocable pumping member, resilient means for imparting delivery strokes thereto, a cyclically movable driving member, an actuating member having a positive connection with the pumping member and adapted to impart suction strokes thereto, said actuating member being conditionally movable with respect to said driving member by the reaction of developed pump pressures on said pumping member for varying the stroke thereof, lost motion means operatively connecting the actuating member and driving member, and hydraulic means in said lost motion connection for damping movement therein.

3. In a variable delivery pump, a reciprocable pumping member, resilient means for imparting delivery strokes thereto, a cyclically movable driving member, an actuating member having a positive connection with the pumping member and adapted to impart suction strokes thereto, said actuating member being conditionally movable with respect to said driving member by the reaction of developed pump pressures on said pumping member for varying the stroke thereof, telescoping means operatively connecting the driving member and actuating member, and hydraulic means operatively associated with said telescoping means for damping telescoping movement thereof.

4. In a variable delivery pump, a reciprocable pumping member, resilient means for imparting delivery strokes thereto, a rotatable cam means adapted to impart suction strokes to the pumping member, an actuating member having a positive connection with the pumping member and conditionally movable thereby with respect to said cam in response to developed pump pressures for varying the stroke of said pumping member, and hydraulic shock damping means operatively connecting the actuating member and cam.

5. In a variable delivery pump, a reciprocable pumping member, resilient means for imparting delivery strokes thereto, a rotatable cam means adapted to impart suction strokes to the pumping member, an actuating member having a positive connection with the pumping member and conditionally movable thereby with respect to said cam in response to developed pump pressures for varying the stroke of said pumping member, a cam follower engaging the cam and having a lost motion connection with said actuating member, and hydraulic means associated with said follower and actuating member for damping the lost movement therebetween.

6. In a variable delivery pump, a reciprocable pumping member, resilient means for imparting delivery strokes thereto, a rotatable cam means adapted to impart suction strokes to the pumping member, an actuating member having a positive connection with the pumping member and conditionally movable thereby with respect to said cam in response to developed pump pressures for varying the stroke of said pumping member, a plunger engaging the cam and having a telescoping connection with the actuating member, and hydraulic shock absorbing means associated with said plunger for damping the movement thereof with respect to the actuating member.

7. In a variable delivery pump, a reciprocable pumping member, resilient means for imparting delivery strokes thereto, an actuating rod having a positive engagement with the pumping member and adapted to impart suction strokes thereto, a rotatable cam, a plunger operatively engaging the cam and having a telescoping connection with the rod, an abutment on the plunger adapted to engage the rod for imparting movement thereto for effecting the suction strokes of the pumping member, and a fluid reservoir in the actuating rod adjacent the plunger, said abutment adapted to displace fluid from the reservoir to thereby absorb the shock of engagement of the abutment with the actuating rod.

8. In a variable displacement pump having a casing defining a pumping chamber and a reservoir for lubricating fluid, a reciprocable pumping member associated with said chamber, resilient means for imparting expulsion strokes to the pumping member, a cyclically movable driving member, an actuating member having a positive connection with the pumping member and adapted to impart suction strokes thereto, said actuating member being conditionally movable with respect to the driving member in response to developed pump pressures for varying pump displacement, lost motion means operatively connecting the actuating member and driving member, and hydraulic shock absorbing means interposed in said lost motion connection, said shock absorbing means being in communication with the reservoir of lubricating oil and receiving its hydraulic operating fluid therefrom.

9. In a fluid delivery pump a housing defining a pumping chamber and a case for lubricating oil, a flexible diaphragm associated with the chamber for displacing the same, spring means for imparting expulsion movement to the diaphragm, a stem having a positive connection with the diaphragm and extending to adjacent the bottom of said lubricant case, a transverse aperture in the stem near its lower end, a cam positioned within the lubricant case for free rotational movement within said aperture, a plunger carried by the stem and having a constant engagement with the cam, an abutment on the plunger adapted to engage the stem to impart thereby suction movement to the diaphragm, and a fluid reservoir in the stem and communicating with the lubricant case to receive fluid therefrom, said abutment adapted to displace said fluid from the reservoir to thereby damp the shock of engagement of the abutment with the stem.

ROLLAND L. ANDERSON.